(12) United States Patent
Macchia et al.

(10) Patent No.: US 11,927,135 B2
(45) Date of Patent: Mar. 12, 2024

(54) INTEGRATED OIL TANK WITH PASSIVE THERMAL MODULATION

(71) Applicant: Pratt & Whitney Canada Corp., Longueuil (CA)

(72) Inventors: Enzo Macchia, Kleinburg (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/890,023

(22) Filed: Aug. 17, 2022

(65) Prior Publication Data

US 2022/0403781 A1 Dec. 22, 2022

Related U.S. Application Data

(63) Continuation of application No. 16/795,843, filed on Feb. 20, 2020, now abandoned.

(51) Int. Cl.
*F02C 7/14* (2006.01)
*F02C 7/06* (2006.01)
*F02C 7/18* (2006.01)

(52) U.S. Cl.
CPC .................. *F02C 7/14* (2013.01); *F02C 7/06* (2013.01); *F02C 7/18* (2013.01); *F05D 2260/22141* (2013.01); *F05D 2260/98* (2013.01)

(58) Field of Classification Search
CPC ...... F02C 7/14; F02C 7/06; F02C 7/18; F05D 2260/22141; F05D 2260/98
See application file for complete search history.

(56) References Cited

U.S. PATENT DOCUMENTS

| | | | |
|---|---|---|---|
| 3,797,561 | A | 3/1974 | Clark |
| 10,072,569 | B2 | 9/2018 | Suciu |
| 10,145,304 | B2 | 12/2018 | Weiner |
| 10,352,191 | B2 | 7/2019 | Weiner |
| 2012/0114468 | A1 | 5/2012 | Elder |
| 2014/0369857 | A1 | 12/2014 | Ingersoll |
| 2015/0023776 | A1 | 1/2015 | Ribarov |
| 2015/0198092 | A1 | 7/2015 | Weiner |
| 2016/0024964 | A1 | 1/2016 | Weiner |
| 2019/0195132 | A1 | 6/2019 | Tajiri |

FOREIGN PATENT DOCUMENTS

| | | |
|---|---|---|
| FR | 3046200 B1 | 6/2019 |
| JP | 11334617 A | 12/1999 |

*Primary Examiner* — Steven M Sutherland
(74) *Attorney, Agent, or Firm* — Getz Balich LLC

(57) ABSTRACT

An oil tank for a gas turbine engine is provided. The oil tank includes an oil cavity defined within structural walls of a nacelle of the gas turbine engine, the oil cavity having an oil inlet and an oil outlet. At least one of the structural walls has an interior side facing the oil cavity and an exterior side. The interior side includes a plurality of upstanding protrusions extending into the oil cavity and fully immersed in oil when the gas turbine engine is in use during steady state operation. The exterior side includes a plurality of fins extending therefrom and exposed to an ambient air stream during steady state operation of the gas turbine engine.

7 Claims, 6 Drawing Sheets

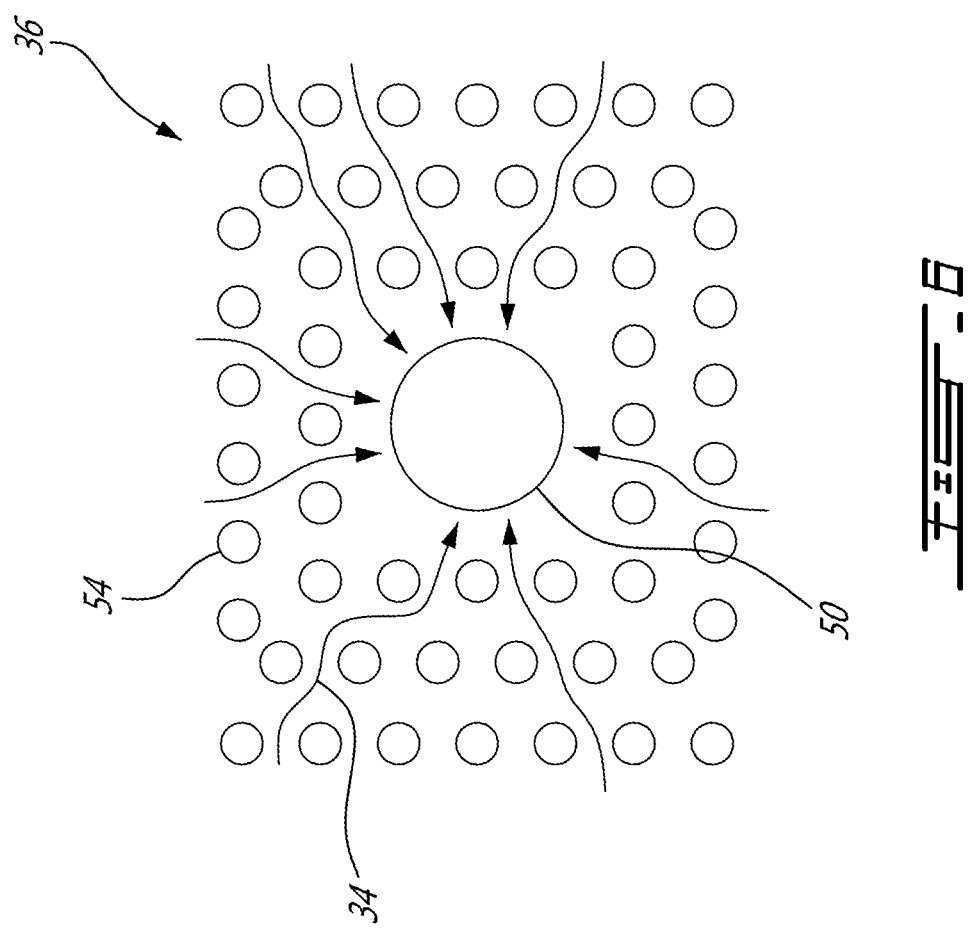

INTEGRATED OIL TANK WITH PASSIVE THERMAL MODULATION

TECHNICAL FIELD

The application relates generally to gas turbine engines and, more particularly, to a heat management system of a gas turbine engine.

BACKGROUND

Oil tanks that are structurally integrated into the casing of a gas turbine engine offer various spatial and packaging-related benefits and typically include a flat structural wall that separates the hot oil to be cooled from the main engine air stream which provides the cooling. However, in such systems the cooling effect can be lacking when the ambient air temperature is too high, and the cooling effect can be too great when the ambient air temperature is too low.

SUMMARY

In one aspect, there is provided an oil tank for a gas turbine engine, comprising an oil cavity defined within structural walls of a nacelle of the gas turbine engine, the oil cavity having an oil inlet and an oil outlet, at least one of the structural walls having an interior side facing the oil cavity and an exterior side, the interior side including a plurality of upstanding protrusions extending into the oil cavity and fully immersed in oil when the gas turbine engine is in use during steady state operation, the exterior side including a plurality of fins extending therefrom and exposed to an ambient air stream during steady state operation of the gas turbine engine.

In another aspect, there is provided a gas turbine engine comprising a casing of the gas turbine engine, an oil system including an oil tank, a plurality of oil lines interconnecting the oil tank with components of the gas turbine engine requiring one or more of heating or cooling, and at least one pump configured for circulating oil through the oil system, and the oil tank being integrated within the casing of the gas turbine engine and having structural walls enclosing an oil cavity, the oil tank including an oil inlet and an oil outlet in communication with the oil cavity, at least one of the structural walls including an interior side facing the oil cavity and an exterior side, the interior side having a plurality of upstanding protrusions extending into the oil tank and configured to be fully immersed in oil when the gas turbine engine is in use during steady state operation, the exterior side including a plurality of fins exposed to ambient air stream during operation of the gas turbine engine.

In a further aspect, there is provided a method for thermally regulating oil in a gas turbine engine, comprising feeding oil to be thermally regulated into an oil tank integrated within a nacelle of the gas turbine engine, and directing the oil through a plurality of upstanding protrusions extending into the oil tank from an interior side of a structural wall of the oil tank, the upstanding protrusions transferring heat between the oil within the oil tank and an ambient air stream flowing through a plurality of fins located on an exterior side of the structural wall.

DESCRIPTION OF THE DRAWINGS

Reference is now made to the accompanying figures in which:

FIG. 6 is a top schematic illustration of the oil cavity shown in FIG. 5.

DETAILED DESCRIPTION

Figure 1:
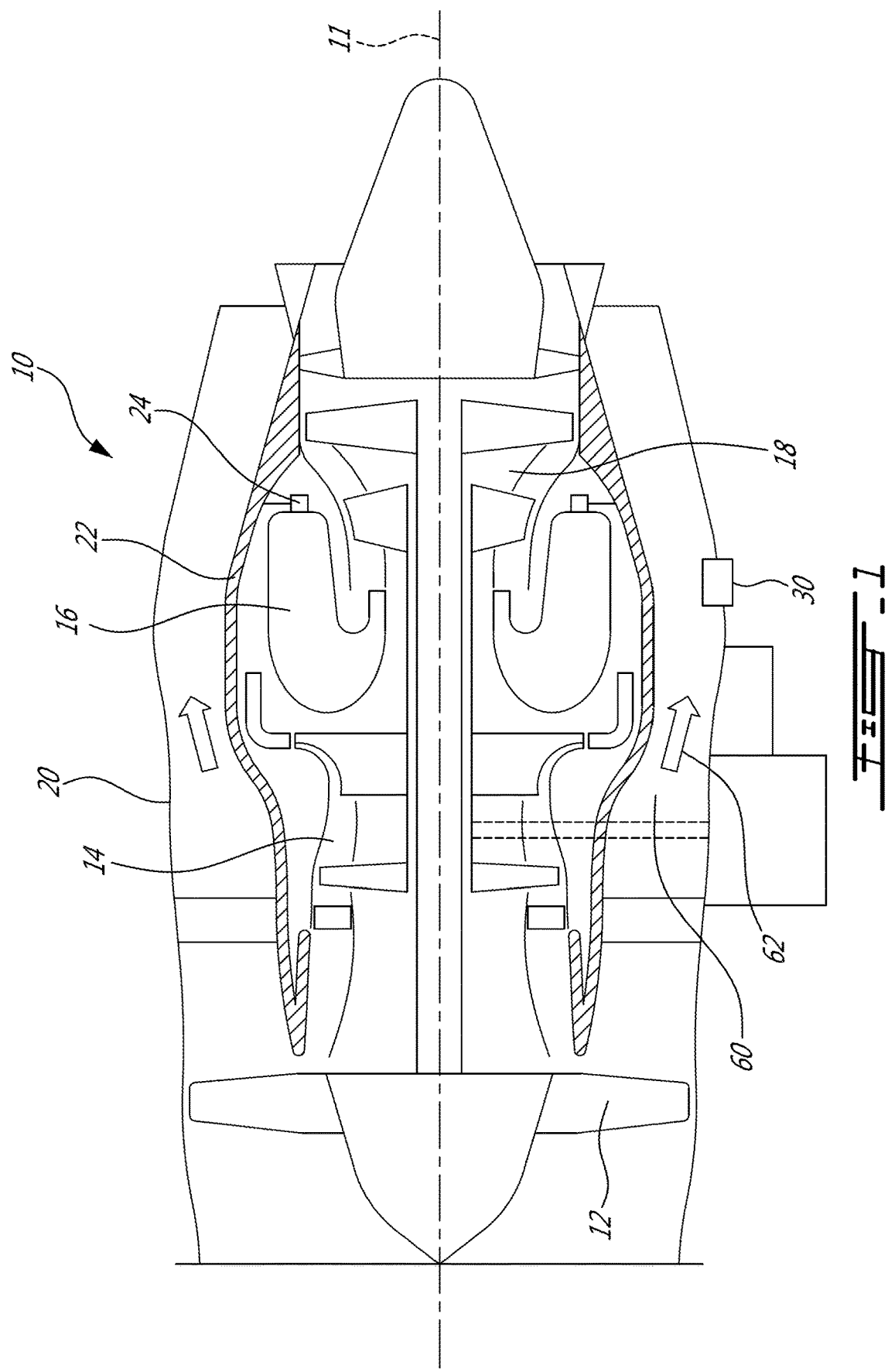
FIG. 1 is a schematic cross sectional view of a gas turbine engine.

FIG. 1 illustrates a gas turbine engine 10 of a type preferably provided for use in subsonic flight, generally comprising in serial flow communication, along a main axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes a housing or nacelle 20 and a core casing 22 defining a main flow path or gas path (not numbered) therethrough. A fuel supply system 24 is provided for supplying fuel to the combustor 16.

The engine 10 includes a heat management system 30 for cooling hot oil circulating in an oil system of the engine 10 and for heating the fuel prior to being delivered to the combustor 16 for combustion. The heat management system 30 schematically illustrated in FIG. 1 does not represent a specific quantity, structure and/or location in the engine. In one particular embodiment, the heat management system 30 includes an oil tank that is structurally integrated into a casing of the gas turbine engine 10. Thus, the oil tanks defined herein may be referred to as "integrated" oil tanks, in that they are integrated into a casing of the engine 10 that is exposed to ambient air. The casing may include, in one embodiment, the housing or nacelle 20 of the gas turbine engine 10 as shown in FIG. 1. In another possible embodiment, the casing into which the oil tank is integrated includes the core engine casing 22, wherein the heat management system 30 includes an oil thank that is structurally integrated into core casing 22 of the gas turbine engine 10.

Figure 2:
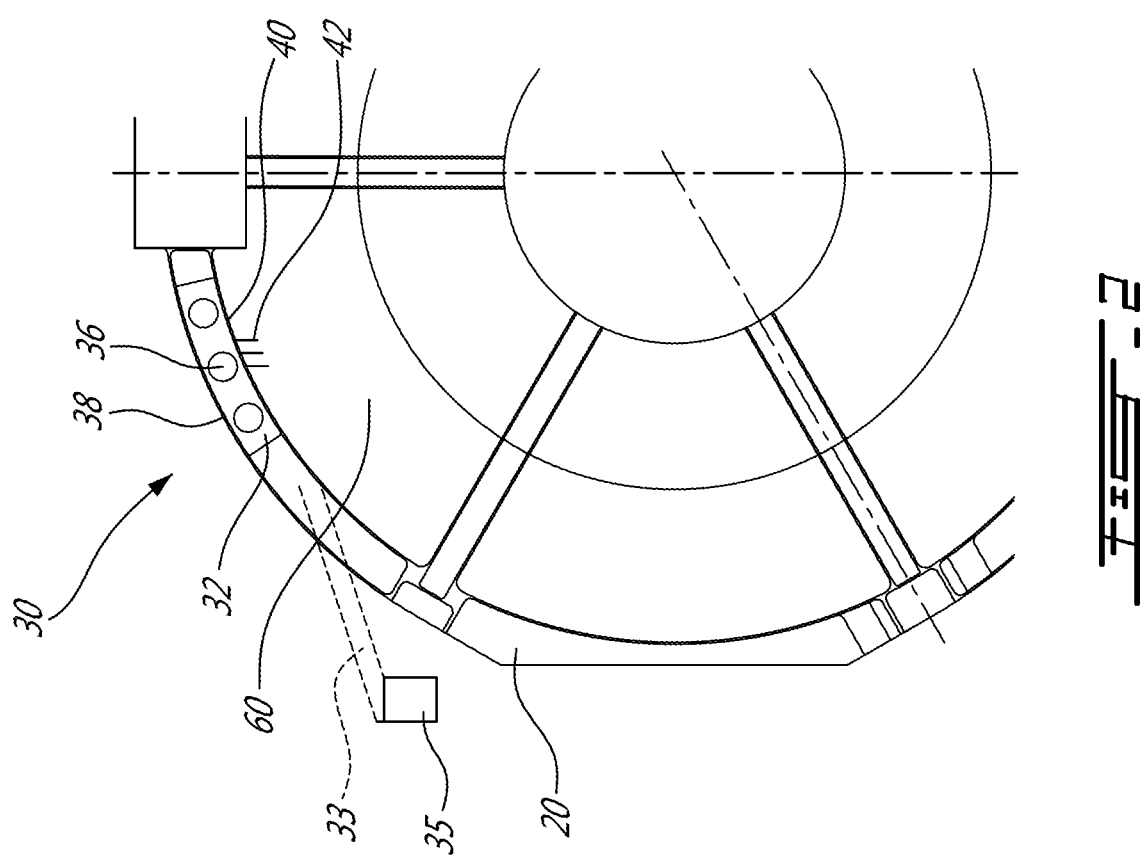
FIG. 2 is a schematic illustration of a heat management system according to an embodiment of the present disclosure.

Referring to FIG. 2, the heat management system 30 includes one or more oil tanks 32 for storing oil 34 that may be used, for example, for lubrication or cooling. In an embodiment, a plurality of oil lines 33 interconnect the oil tank(s) 32 with other components of the gas turbine engine 10, and one or more pumps 35 circulate oil throughout the oil system. The oil tank(s) 32 includes one or more oil cavities 36 defined within the structural walls 38 of the nacelle 20. As will be discussed in further detail below, an exterior side 40 of one of the structural walls 38 is exposed to a bypass air duct 60 between the nacelle 20 and core casing 22 through which an ambient air stream 62 passes as the engine 10 is operating. To promote heat transfer between the ambient air stream 62 and the oil in the oil cavity(ies) 36, the exterior side 40 includes a plurality of fins 42 extending therefrom. As such, the fins 42 are exposed to the ambient air stream 62 while the gas turbine engine 10 is operating. The increased heat transferring surface area provided by the fins 42 in comparison to a flat or fin-less exterior side 40 provides additional cooling capacity for the heat management system 30. The fins 42 may be aligned with the ambient air stream 62, or may be angled relative to the ambient air stream 62. In embodiments, various quantities, heights and shapes of fins 42 may be used depending on the specific application to best maximize the heat transferring capabilities of the heat management system 30 while minimizing its overall weight and effects on the ambient air stream 62 passing through the bypass air duct 60. In various embodiments, the height-to-thickness ratio of the fins 42 may be selected based on the specific application and chosen materials. As an example, in the case of fins 42 made from magnesium alloys, the fins 42 may have a height-to-thickness ratio of up to roughly eighteen.

Figure 3:
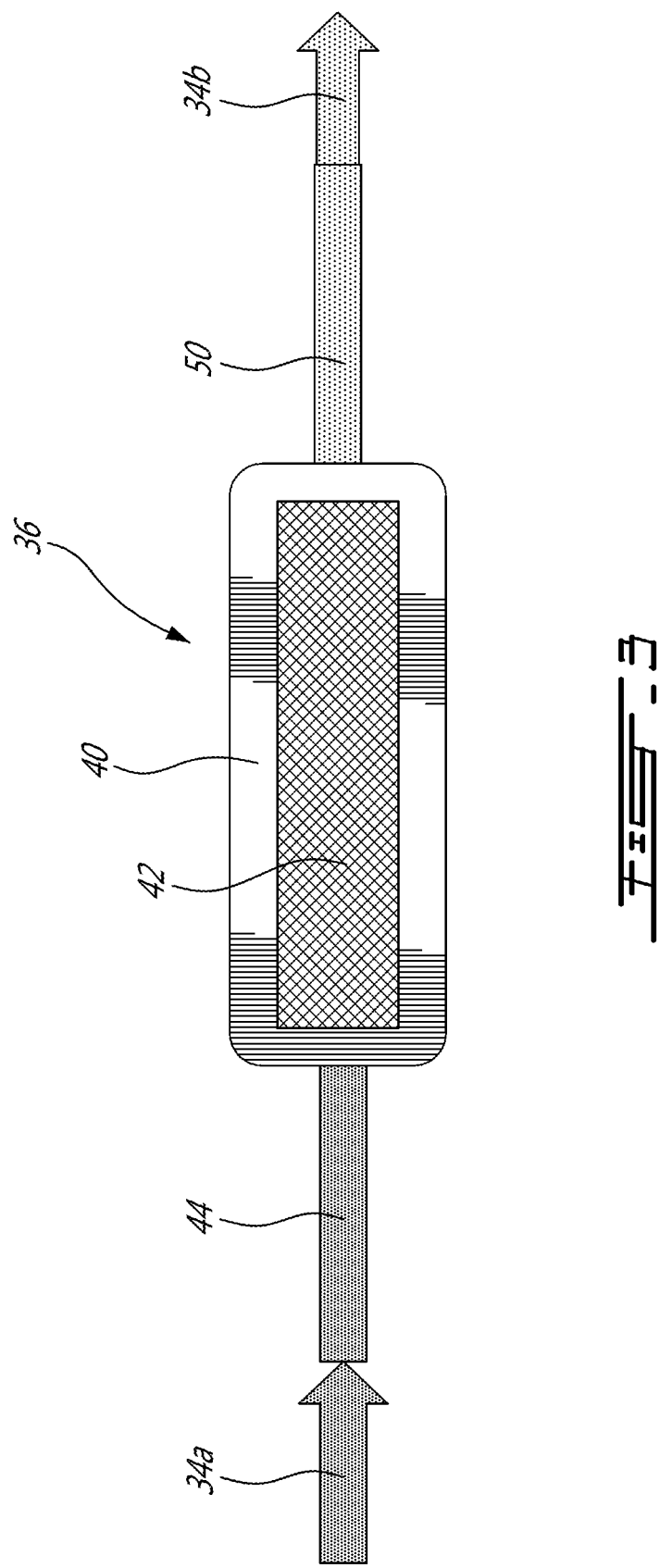
FIG. 3 is bottom schematic illustration of the heat management system shown in FIG. 2.
Figure 4:
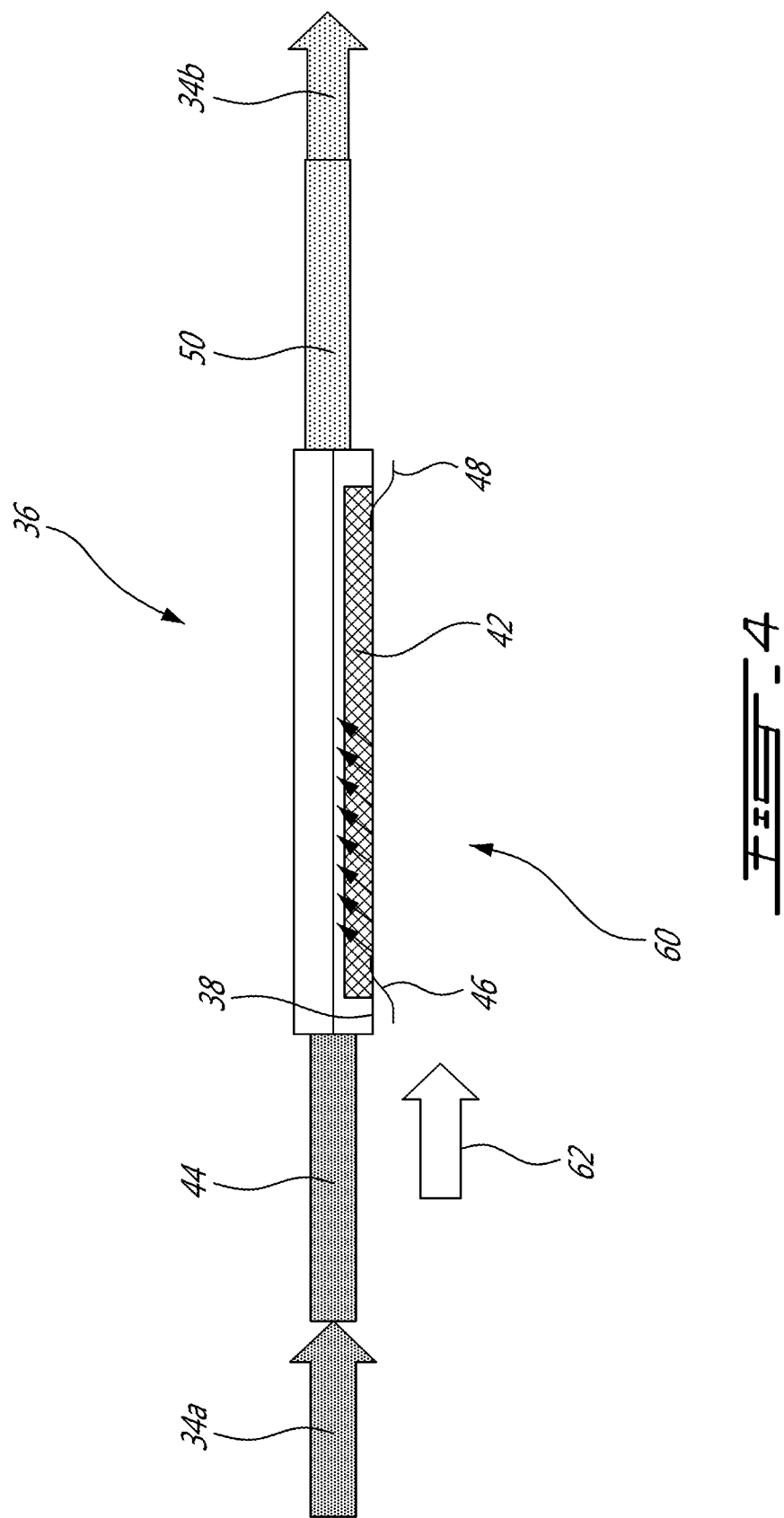
FIG. 4 is a side schematic illustration of the heat management system shown in FIG. 2.

Referring to FIGS. 3 and 4, an embodiment of a heat management system 30 is schematically shown. Hot oil 34a is transported to the oil cavity(ies) 36, illustratively via an oil inlet 44. As the hot oil 34a passes through the oil cavity(ies) 36, the ambient air stream 62 flowing through the bypass air duct 60 passes through the fins 42 to cool the oil 34 via heat transfer through the structural wall 38. In an embodiment, an inlet scoop 46 directs or diverts the ambient air stream 62 towards the fins 42 and an outlet scoop 48 directs or diverts the directed or diverted air back towards the main ambient air stream 62. In various embodiments, the fins 42 may be disposed against the exterior side 40 of the structural wall 38, or alternatively may be installed in a recess or cavity in the exterior side 40, as shown in FIG. 4. Once the oil 34 has been cooled, the cooled oil 34b flows through an oil outlet 50, for example an oil sump, to other parts of the engine 10 such as a main oil pump (not shown).

Figure 5:
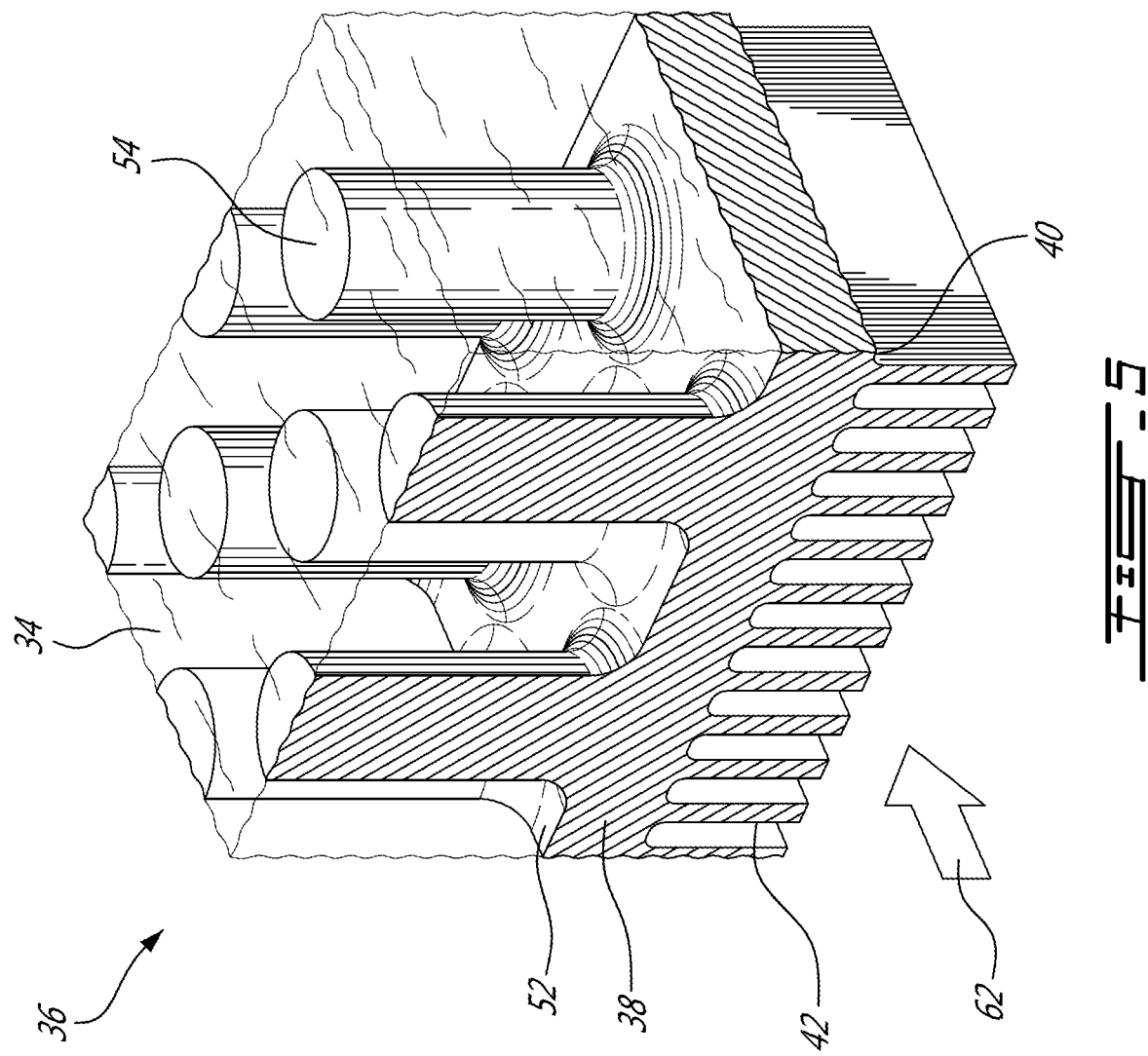
FIG. 5 is a partial cutaway perspective illustration of an oil cavity for the heat management system shown in FIG. 2.

Referring now to FIG. 5, an interior side 52 of the structural wall 38 includes a plurality of upstanding protrusions 54 extending into the oil cavity 36. When the gas turbine engine 10 is in steady state operation, meaning when the gas turbine engine 10 is operating under typical or standard conditions, the protrusions 54 are configured to be fully immersed in oil 34 to promote heat transfer between the ambient air stream 62 and the oil 34. As such, while in different embodiments the heights of the protrusions 54 may vary, for example depending on the level of heat transfer required or the size of the oil cavity 36, the heights of the protrusions 52 are preferably less than the minimum level of oil 34 in the oil cavity 36 under standard operating conditions. The protrusions 54 may be regularly or irregularly shaped, for example having circular or elliptical cross-sections. The chosen shape may promote or impede the flow of oil 34 through the oil cavity 36, which may increase or decrease the level of heat transfer achieved. In use, heat from the oil 34 is transferred through the protrusions 54 on the interior side 52 of the structural wall 38 to the fins 42 on the exterior side 40 of the structural wall 38, and then to the ambient air flow 62 passing through the fins 42.

Referring now to FIG. 6, the oil 34 is shown flowing in between the protrusions 54 in the oil cavity 36 towards the oil outlet 50. In an embodiment, when the ambient air stream 62 drops below a given temperature, the temperature of the oil 34 in the oil cavity 36 similarly drops so that the viscosity and thus velocity of the oil 34 drop as well and eventually the flow of oil 34 becomes laminar, thus reducing the level of heat transfer between the oil 34 and the ambient air stream 62. As the temperature of the ambient air stream 62 drops even more, eventually the oil 34 virtually stops flowing around the protrusions 54 so that little-to-no heat transfer occurs. As the heights of the protrusions 54 preferably do not exceed the level of oil 34 in the oil cavity 36, the oil 34 disposed above the protrusions is able to continue flowing through the oil cavity 36 towards the oil outlet 50 while the practically motionless oil 34 below acts as an insulating surface layer. In such cases of low ambient air stream 62 temperatures, there is little need for the oil 34 to be cooled, and as such the heat management system 30 self-regulates by allowing the oil 34 to flow towards the oil outlet 50 without undergoing any unnecessary heat transfer. Once the temperature of the ambient air stream 62 increases and heat transfer once again becomes needed, the oil 34 between the protrusions 54 rises in temperature and begins the flow, allowing the cooling process to resume. Such cooling may be required, for example, for oil temperatures in excess of 250° F. and/or for oil viscosities below 3 cSt. Alternatively, the flow of oil 34 between the protrusions 54 may virtually stop at an oil viscosity of around 100 cSt, corresponding to an ambient air stream 62 temperature of around 32° F. The oil cooling function of the heat management system 30 may cease once the oil reaches an oil viscosity of around 1000 cSt and/or the ambient air stream 62 is at a temperature of around −5° F. Other temperature and viscosity ranges may apply depending on a variety of factors such as the type of oil used, the elevation, and other geographical and environmental considerations.

In an embodiment, the height of each protrusion 54 may be roughly 90 to 300 thousandth's of an inch (roughly 2 to 8 millimeters). The protrusions 54 may be arranged around the oil outlet 50 in a regular or irregular pattern and may be spaced apart by roughly 60 to 200 thousandth's of an inch. Other heights and arrangements may be used, for example depending on the specific operating conditions in which the engine 10 is configured for. The spacing of the protrusions 54 may be configured to ensure that the Reynold's Number of the oil 34 flowing between the protrusions 54 becomes laminar below a given temperature of the ambient air stream 62. In an exemplary embodiment, the flow of oil 34 may remain laminar at ambient air stream 62 temperatures of up to around 85° F. In an embodiment, the protrusions 54 are arranged so that they are positioned closer to one another as they approach the oil outlet 50, while the protrusions 54 may be spaced further apart as they are positioned further away from the oil outlet 50. In various embodiments, the protrusions 54 and fins 42 may be cast or brazed on an existing oil cavity 36 structure. Alternatively, they may be formed by additive manufacturing. The protrusions 54 may be columnar or may include a porous, mesh, open foam or reticular structure.

The implementation of a structural wall 38 of an oil cavity(ies) 36 with protrusions 54 on the interior side 52 extending into the oil cavity(ies) 36 and fins 42 on the exterior side 40 exposed to the ambient air stream 62 provides for a heat management system 30 with an increased effective operating temperature range without requiring a thermal-bypass valve. As such, the overall weight of the heat management system 30, and thus the gas turbine engine 10, is reduced while offering better inclement weather protection. In addition, the self-regulating capabilities of the heat management system 30 limit the risks of excessive heating or cooling on hot or cold days, respectively. In another embodiment, the heat management system 30 may include a fuel and oil heat exchanger (not shown) upstream of the oil tank(s) 32 and configured to heat fuel before it enters the combustor 16 for more efficient combustion. In such an embodiment, cold fuel is directed to the heat management system 30 and is cooled by the hot oil 34a before it enters the oil cavity 36 and before the fuel is delivered to the fuel supply system 24.

The present disclosure also teaches a method for thermally regulating oil 34 in a gas turbine engine 10. The oil 34 to be thermally regulated is fed into an oil tank 32 integrated within a nacelle 20 of the gas turbine engine 10. The oil 34 is then directed through a plurality of upstanding protrusions 54 extending into the oil tank 32 from an interior side 52 of a structural wall 38 of the oil tank 32, the upstanding protrusions 54 transferring heat between the oil 34 within the oil tank 32 and an ambient air stream 62 flowing through a plurality of fins 42 located on an exterior side 40 of the structural wall 38.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for thermally regulating oil in a gas turbine engine (GTE), comprising:
   passing a first air flow of ambient air at a first temperature within an air duct during a first mode of operation of the GTE;
   passing a second air flow of ambient air at a second temperature within the air duct during a second mode of operation of the GTE, wherein the first temperature is greater than the second temperature; and
   pumping a flow of oil through an oil tank, the flow of oil having a first portion and a remaining portion, the oil having a viscosity that varies as a function of temperature, the oil tank having an interior cavity at least partially defined by at least one structural wall, wherein the at least one structural wall includes an interior side surface contiguous with the interior cavity and an exterior side surface opposite the interior side surface, a plurality of first heat transfer protrusions extending outwardly from the exterior side surface and into the air duct, and a plurality of second heat transfer protrusions extending outwardly from the interior side surface and into the interior cavity, wherein the plurality of second heat transfer protrusions are spaced apart from one another and thereby define flow passages amongst the plurality of second heat transfer protrusions;
   wherein the interior cavity of the oil tank and the plurality of second heat transfer protrusions are configured so that the plurality of second heat transfer protrusions are immersed in the flow of oil during operation of the GTE; and
   wherein the interior cavity of the oil tank, the plurality of second heat transfer protrusions, and the oil are configured such that in the second mode of operation the first portion of the flow of oil is disposed within the flow passages amongst the plurality of second heat transfer protrusions and the first portion of the flow of oil thermally insulates the remaining portion of the oil and thereby mitigates heat transfer between the remaining portion of the flow of oil and the plurality of first heat transfer protrusions; and
   wherein in the second mode of operation of the GTE the first portion of the flow of oil disposed within the flow passages is substantially stationary.

2. The method of claim 1, wherein in the first mode of operation of the GTE the first portion of the flow of oil disposed within the flow passages passes amongst the plurality of second heat transfer protrusions and permits heat transfer between the flow of oil and the plurality of first heat transfer protrusions.

3. The method of claim 2, wherein the first portion of the flow of oil disposed within the flow passages rises in temperature as the GTE transitions from the second mode of operation of the GTE to the first mode of operation of the GTE, and the first portion of the flow of oil disposed within the flow passages transitions from thermally insulating the remaining portion of the flow of oil in the second mode of operation of the GTE to permitting heat transfer between the plurality of first heat transfer protrusions and the remaining portion of the flow of oil in the first mode of operation of the GTE.

4. The method of claim 3, wherein each second heat transfer protrusion has a base end disposed at the interior side surface, a distal end disposed opposite the base end, a height that extends from the base end to the distal end, and one or more one side surfaces disposed between the base end and the distal end, wherein the flow passages are disposed between the one or more side surfaces of the plurality of second heat transfer protrusions.

5. The method of claim 4, wherein the oil in the interior cavity covers the distal ends of the second heat transfer protrusions.

6. The method of claim 1, wherein the oil tank is defined within structural walls of a nacelle of the gas turbine engine.

7. The method of claim 1, wherein the plurality of first heat transfer protrusions are configured as fins.

\* \* \* \* \*